United States Patent [19]
Anderson

[11] 3,770,293
[45] Nov. 6, 1973

[54] SAFETY ACCESSORY FOR SNOWMOBILES

[76] Inventor: Robert F. Anderson, 3613 13th St., Menominee, Mich. 49858

[22] Filed: Mar. 17, 1971

[21] Appl. No.: 125,109

[52] U.S. Cl. .............................. 280/150 R, 180/5 R
[51] Int. Cl. ............................................. B60r 19/00
[58] Field of Search ................. 280/150 R; 180/5 R

[56] References Cited
UNITED STATES PATENTS

| | | | |
|---|---|---|---|
| 1,107,832 | 8/1914 | Palis | 280/150 R |
| 1,122,742 | 12/1914 | Halbach | 280/150 R |
| 3,680,882 | 8/1972 | Fleury | 180/5 R |

*Primary Examiner*—Robert R. Song
*Attorney*—C. Kenneth Bjork

[57] ABSTRACT

The invention is a wire cutter for permanent or removable attachment to the front of a snowmobile which comprises a plurality of hook-like snagging and shearing members mounted along a bar which conforms generally to the nose configuration of a snowmobile and extends upward from below the body of the snowmobile to at least about the height of an occupant of the vehicle. In operation, this safety attachment cuts wire strands of fences in the event a snowmobile encounters a fence during operation.

10 Claims, 8 Drawing Figures

PATENTED NOV 6 1973 3,770,293

INVENTOR.
Robert F. Anderson
BY
C. Kenneth Bjork
AGENT

INVENTOR.
Robert F. Anderson
BY
C. Kenneth Bjork
AGENT 3,770,293

SAFETY ACCESSORY FOR SNOWMOBILES

BACKGROUND OF THE INVENTION

Snowmobiles have rapidly gained wide acceptance over the past several years and their popularity is continually increasing. These machines are particularly useful as rescue vehicles, passenger and cargo transports to reach inaccessible areas and as winter recreational sport devices. Because of their versatility and manuverability they can be used in almost any snow covered terrain both in wooded and open areas. Since they can be easily driven at high speeds and can traverse great distances, it is evident that drivers can well encounter unexpected obstacles. In normal operation, the safe driver can spot fixed objects such as fences, for example, and take the necessary precautions. However, it is entirely possible that because of snow conditions, obscured visibility, darkness and the like a snowmobile may accidentally strike a wire fence while moving at a speed such that the sudden stop or wire snagging a rider can cause serious injury or even death. Also, in some rescue operations, it may be necessary to go through a fence to rapidly move from area to area in completing the rescue mission.

Heretofore, there has been no safety device available for use with a snowmobile that will provide for minimizing or even completely eliminating injury to the occupants of snowmobiles which accidentally or otherwise strike wire fences substantially head-on. It is recognized that the present apparatus is meant to be used only in the prevention of accidents and in emergency situations as set forth above and I am not suggesting or proposing in any way that this safety device be used to recklessly or maliciously destroy property.

Numerous objects and advantages of the present safety device which comprises a plurality of snagging and cutting members on a support bar and which during use is positioned at the front of a snowmobile will become apparent from the detailed description presented hereinafter when read in conjunction with the accompanying drawing.

GENERAL SUMMARY OF THE INVENTION

Figure 7:
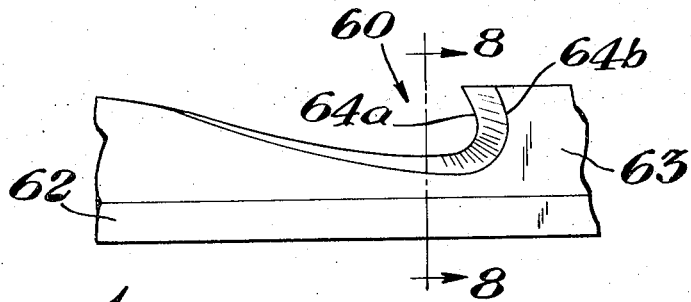
FIG. 7 is a side elevation of another preferred wire snagging and cutting hook embodiment of the present invention.

The snowmobile safety accessory of the present invention comprises an elongated bar which conforms generally along a major portion of its lower length to the vertical front profile of the center section of a snowmobile. The lower end of the bar projects outwardly and ends below or near the bottom of the snowmobile and curves upward along the nose, sloping upwardly, usually substantially vertically above the top of the vehicle and terminating a distance above the snowmobile so as to be several inches at least above the head of an occupant, i.e., driver or rider while in a kneeling position. Generally this member is from about 50 to about 60 inches in height as measured vertically from the top of the seat of the vehicle.

In one preferred embodiment the lower portion of the outward projection extends back toward the snowmobile, i.e. the projection is angular or rounded in shape. This assures that in operation as wire strands such as from a barbed wire fence, conventional stock fence, woven mesh fence, etc. contact the bar they are deflected to one side or the other of this projection and smoothly slide along the bar into a wire cutting member without abruptly stopping or slowing the machine.

The bar usually is square or rectangular in cross-section, ⌴-shaped angle iron, ⊥-bar or of other convenient cross-sectional shape. Usually it is of a steel, for example, spring steel, stainless steel or the like high strength materials which readily can be shaped or formed to a desired configuration for use with a given make and model of snowmobile. The high strength ferrous based metals are also suitable.

Positioned at intervals along the length of the bar are cutter clips which snag and cut the wire strands. In general, these members are hooks, each having an angled inner face to provide a throat which catches a wire strand as it slides along the bar and shears through this material. Ordinarily, the interior face of the hook which contacts the wire is fabricated to provide an angular, tapered cutting surface across its width from edge to edge such that one sharp edge of the surface contacts the wire before the other edge thus acting as a tapered chisel. The cutting hooks can be integral to the bar; alternatively, they can be preformed and then securely attached at predetermined positions to the bar along its length. It is desirable that there be at least one hook below the projection and at least one above the projection immediately below the windshield of the snowmobile. Usually there is a cutter hook also near the top end of the bar. Preferably the portion of the bar from the bottom end up to the point immediately below the windshield of the snowmobile contains from about 2 to about 4 of the hooks spaced apart at intervals of from about 6 to about 18 inches and usually about 12 inches apart when measured along a vertical plane. For the optimum in safety to the rider there are no hooks in the upper curved portion of the bar between the hook at the bottom of the vehicle's windshield and that at the top end of the bar. If hooks were to be positioned along this portion of the bar, fence wires could catch on these instead of sliding on up the bar to the top hook; in some instances these wires might bend the bar back toward the rider before shearing through. This action would then permit higher strands of wire to be missed by the upper hook if the bar were bent out of position.

The cutting surface of the hooks should be of a high carbon steel, for example, stainless steel or other material capable of being machined or ground to take and hold a sharp cutting edge. Other steels and ferrous based alloys capable of being tempered and hardened to provide extra high strength and hardness are preferred as materials of construction for the hook members.

The hooks can be integral to the bar; i.e., they can be machined, ground or otherwise formed directly into the bar's surface. Also, they can be fabricated as separate units and then welded, riveted, bolted or otherwise rigidly fastened or bonded to the bar.

The wire cutting safety unit can be permanently mounted onto a snowmobile as part of the vehicle as assembled at the factory. In such instances the bar can be welded, bolted, screwed or otherwise attached to the frame or surface covering of the snowmobile. Similarly, snowmobiles not having the safety device built in can have these permanently attached at a later date by the same means.

The safety unit can be designed, as will be described more fully hereinafter in the description of various illustrative preferred embodiments, to be readily mounted onto and removed from a vehicle. Usually such detachable units will take advantage of the tow bar present across the front lower portion of most models. The lower end of the bar of the safety unit can end in a bracket, such as for example, a clevis or other securing means which encompasses the tow bar and is held in place by a nut and bolt, restraining pin, cotter pin or other locking means. The bar is further held to the vehicle by a bracket, clips, or other connectors fastened at intervals to the snowmobile upwards along the front center of its nose. These securing means can be of any of a variety of designs which hold the safety bar firmly in place but provide for ready connection and removal of the unit from a snowmobile.

In both the permanently attached and removable wire cutter units which are not a part of the snowmobile as manufactured, the bar member can be shaped to contain the outward projection near its bottom and then be formed to conform generally with the front profile of a given make or model of snowmobile.

Universal "do it yourself" kits are also encompassed by the disclosure of the present invention wherein a straight bar with mounting brackets and cutter hooks is supplied. The bar can be shaped to fit a given snowmobile profile and the mounting brackets attached at appropriate places to the vehicle. Also, the safety bar can have a number of spaced apart through holes to which cutter members can be attached at predetermined positions by means of rivets, bolts and nuts or the like. For such assemblies it is preferred that the bar be of brass, an aluminum alloy, wrought iron or other high strength metal which is capable of being bent and worked into a desired shape or form. The cutter hooks again are of a metal which will take and retain a sharp cutting edge.

DESCRIPTION OF PREFERRED EMBODIMENTS

One preferred embodiment of the safety device 10 of the present invention which is removable from a snowmobile comprises an elongated square bar 12 of from about three-eighths inch to about 1 inch on a side, and preferably from about one-half to about five-eighths inch on a side. A plurality of cutting hooks 14 are positioned at predetermined intervals along its length. Near the bottom end of the bar 12 is fitted a clevis type hitch assembly 16. As shown in the depicted embodiment of FIG. 1, the arms of the hitch 16 pass over a tow bar 18 of a snowmobile being held in place by a securing pin 20. The bar 12 is held in position part way up along its length by a bracket assembly 22 mounted to the center front nose portion of the snowmobile about half way between its bottom and its top. The remaining section of the bar 12 which is above the snowmobile is substantially sloping upward; i.e., curving, and has a rounded knob 24 placed over its top end. This knob 24 usually is of a bright colored or fluorescent plastic material. The bright colored, readily visible, rounded knob 24 serves both as a warning or recognition device and protects the rider against the end of the metal bar.

As shown, the bar 12 has an outwardly projecting rounded section 26 near the lower end. One hook 14 is positioned at the end of the bar 12 below this section 26; another hook 14 is just above this outwardly projecting section 26. A third hook is placed about 12 inches further up the bar just below a bracket 22 which holds the bar in a predetermined position. Another hook 14 is placed on the bar above the bracket and immediately below the bottom of the snowmobile windshield. The final hook 14 is fastened to the bar 12 just below knob 24. Other hooks 14 can be used along the bar 12 above the projection 26 and below the bottom of the windshield.

Figure 3:
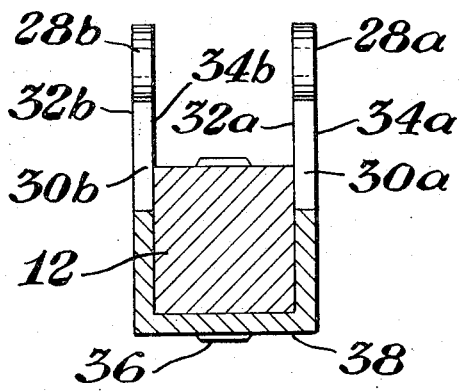
FIG. 3 is a sectional view taken along line 3—3 of the hook shown in FIG. 2.
Figure 2:
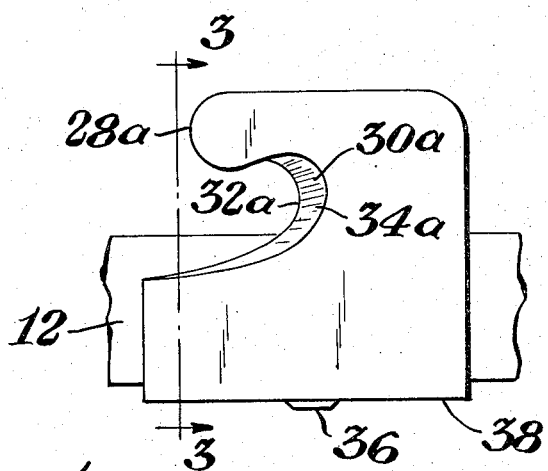
FIG. 2 is a side elevation of one of the snagging and cutting hook members of the safety device depicted in FIG. 1.

FIGS. 2 and 3 show the detail of the snagging and cutting hooks 14 employed in the safety unit 10. Each hook 14 is a substantially ⊔-shaped member having an inside width so as to fit over a bar 12. The front of each sidewall 28a–28b of hook 14 is cut out to define the wire snagging and cutting surface. The wall face 30a–30b at the throat of each cut out section; i.e., the throat of the hook, is cut at an angle across this surface such that one edge 32a or 32b is ahead of the other edge 34a or 34b respectively on a given sidewall 28a or 28b. The hook 14 is fastened to the bar 12 by means of a rivet 36 passing from the bottom 38 of the hook 14 up through the bar 12.

Figure 4:
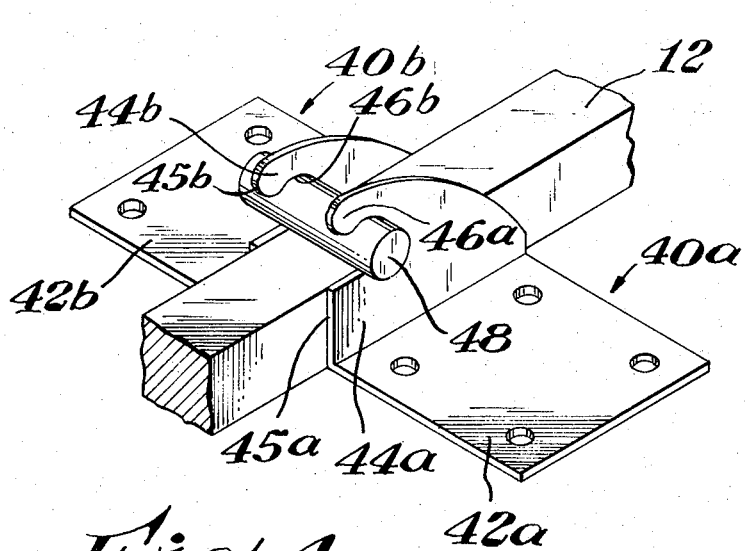
FIG. 4 is an enlarged isometric view of a bar support unit as employed in the embodiment of FIG. 1.

FIG. 4 shows in detail the mounting bracket assembly 22. This unit 22 consists of a pair of curved sidewall ∟-shaped holders 40a–40b.

Each of the members 40a–40b has its base 42a and 42b mounted to the nose of a snowmobile about half way between its bottom and top and approximately centered with respect to the sides of the vehicle as viewed from the front. The upright arms 44a–44b of the members 40a and 40b define in their forward faces 45a–45b a hook configuration 46a–46b near their tops.

When bracket 22 is mounted on a snowmobile, the two members 40a–40b are welded, riveted, bolted or otherwise fastened to the vehicle and positioned a distance apart sufficient to permit a bar 12 to be freely slid therebetween. Preferably, the distance between the substantially vertical upright arms 44a–44b is such that the bar 12 is movable between these arms 44a–44b but is held snugly between these members. A rod 48 is welded at a predetermined position across the top of the bar 12. This rod 48 is of a length to assure that it extends beyond the width of bar 12 and is caught and held by the hooks 46a–46b as the safety unit is fastened to a snowmobile. The diameter of rod 48 is selected to permit free movement into hooks 46a–46b and preferably is just slightly smaller than the opening of the hooks 46a–46b.

Figure 5:
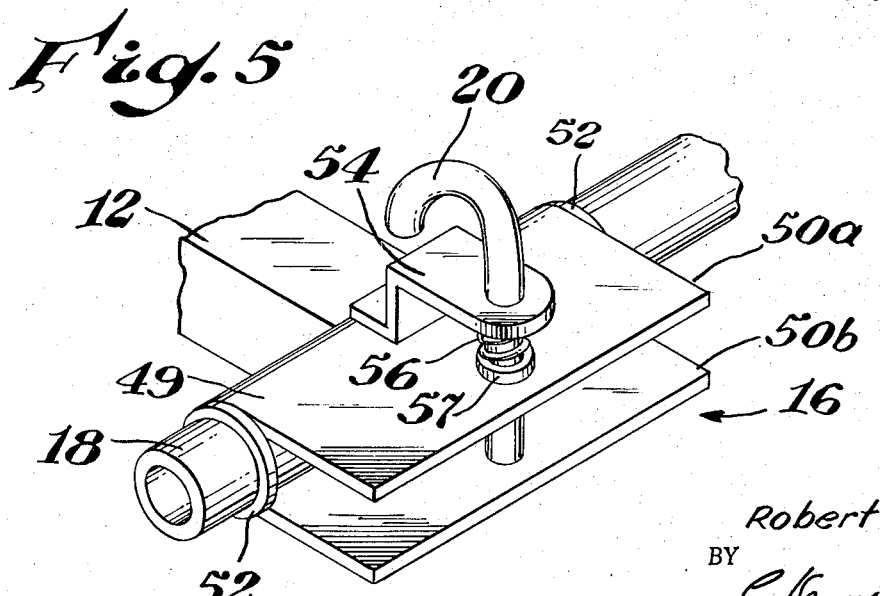
FIG. 5 is an enlarged isometric view of the lower mounting assembly for the embodiment shown in FIG. 1.

FIG. 5 shows in detail one embodiment of a mounting hitch 16 for fastening a safety unit to the tow bar 18 of a snowmobile. In this depicted embodiment, a wide clevis 49 of open distance between its arms 50a–50b, sufficient such that the arms 50a–50b pass over a tow bar 18, is welded or otherwise secured to a bar 12. To assure that the clevis 49 does not slide sideways along bar 18 during use, conveniently, a stop or barrier, such as a ring 52, is friction fit or welded around the bar 18 just beyond each end of the clevis 49. Alternatively, a pin, bolt and nut or other restraining means can be used as a stop instead of the ring 52. In the depicted embodiment, the securing pin 20 is a finger operated member passing through a right angled holding bracket 54 on top of the upper arm 50a and through the arms 50a–50b of clevis 49. A spring 56 having its lower end under tension pressing against a washer 57 welded to or machined onto the pin 20 and the other end pressing against bracket 54 keeps the pin 20 under tension so that it normally is forced downwards. To release or mount the hitch 16 on a towbar 18, the pin 20 is pulled upward to permit the clevis 49 to be pushed over the towbar 18. Once the clevis 49 is in position the pin 20 is allowed to drop down into place.

Figure 1:
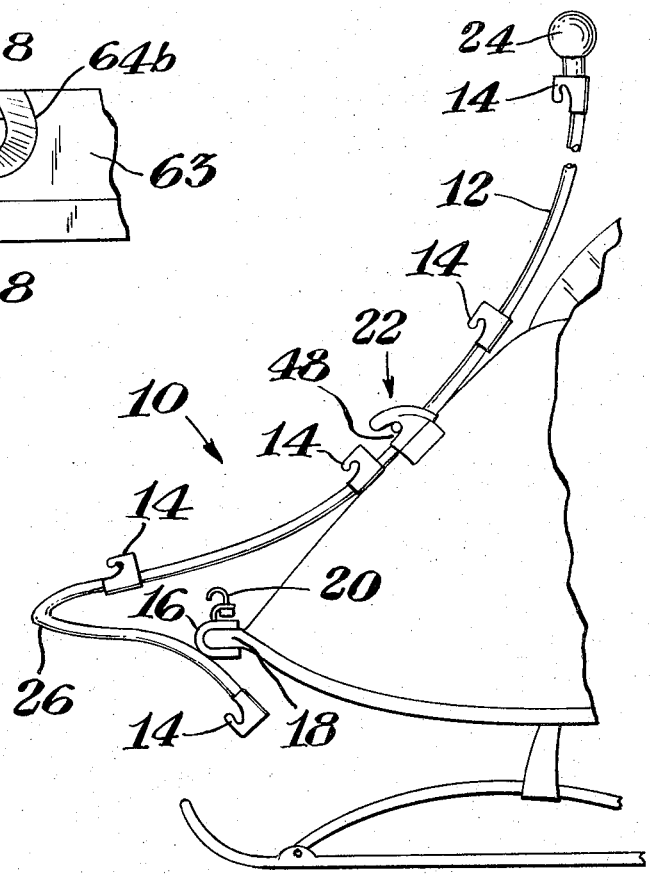
FIG. 1 is a side elevation of one embodiment of a wire snagging and cutting apparatus of the present invention mounted in place on the front of a snowmobile.
Figure 6:
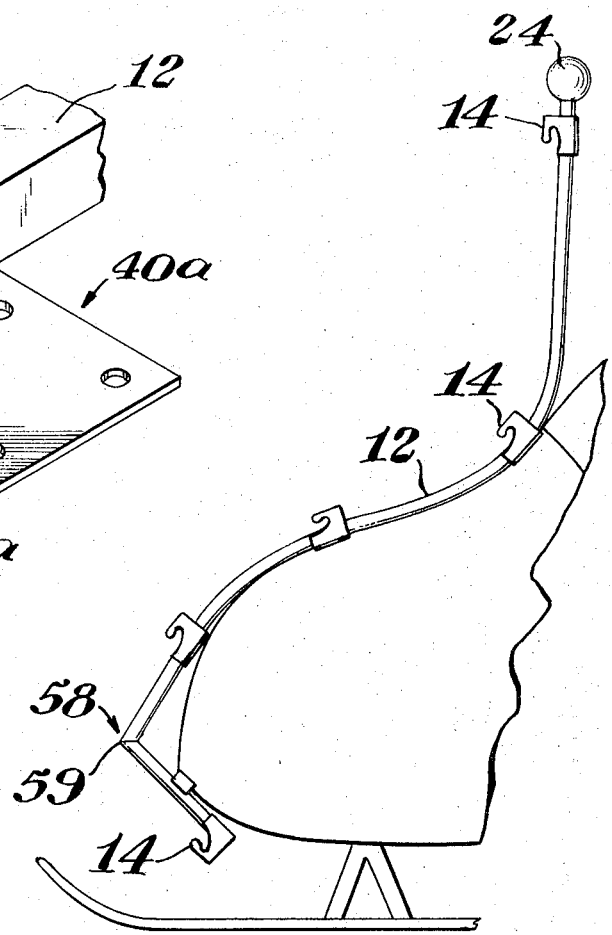
FIG. 6 is a side elevation of another embodiment of safety unit of the present invention permanently attached to a snowmobile.

In the embodiment of safety unit shown in FIG. 6, the hooks 14 are positioned approximately in the same position as in the unit of FIG. 1. The bar 12 is fastened to the snowmobile between this bottom hook and the apex 59 of a projection 58. Conveniently, the bar is riveted, welded, or bolted to the lower frame member of the snowmobile. In this embodiment, when the safety unit is a permanent part of the snowmobile and is integral to the vehicle as it is being assembled, because of the outwardly projecting point, the bar 12 can serve as a tow bar and replace the conventional horizontal tow bar of such vehicles. If the safety unit is to be attached to a snowmobile having a hroizontal tow bar 18, the unit can readily be affixed to this member.

Above the outwardly projecting pointed section 58, as shown the bar 12 is curved and shaped so as to conform with the contoured profile of the central nose portion of the snowmobile upwardly toward the top of the machine. Since this bar 12 is of the same shape as the vehicle, it can be bolted or riveted directly thereto. Alternatively, the bar can be welded or otherwise bonded to the outer surface of the machine.

Figure 8:
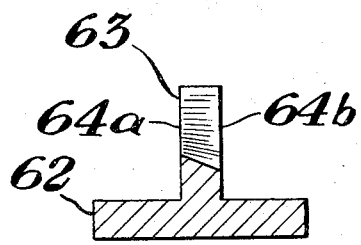
FIG. 8 is a sectional view taken along line 8—8 of FIG. 7.

The hooks 60 of the embodiment depicted in FIGS. 7 and 8 are to another preferred embodiment wherein these are an integral part of a bar 62. In this embodiment, a T-bar stock is used, the hooks 60 being formed into the upright member 63 of the bar at predetermined intervals along its length. The bar 62 is formed into a predetermined shape and the hooks 60 are machined or ground therein. Alternatively, the hooks 60 can be formed at predetermined places into a straight bar, and the bar can then be bent into its desired shape.

The hooks 60, in the same manner as hooks 14, have. the surface across the throat of the indentation angled from edge 64a to edge 64b.

This safety unit wherein the hooks 60 are part of a bar 62 can be either permanently attached to a snowmobile or demountably affixed thereto using clamps and brackets as described herein.

From the generic disclosure and the description of the various illustrative preferred embodiments described hereinbefore, the nature of the present invention readily is appreciated and understood. It is to be understood that I contemplate that the present safety unit can be fitted with other changes and modifications.

For example, the upper substantially vertical section of the bar can be hinged near the point where it is connected to the top of a snowmobile. This hinge is designed to permit the bar to be folded or pivoted forward and clipped or fastened to the bar portion attached to the nose portion of the snowmobile if deisred.

Also, the connector where the bar is held near the top of a snowmobile can be of any of a variety of designs by which the bar is firmly held in place during operation, but where the unit can readily be removed. This unit can consist of a curved sidewall bracket having a front wall and an open back and of an interior width to freely accommodate a bar 12. The bottom of this bracket is mounted to a snowmobile about half way between its bottom and its top and approximately centered from side to side as viewed from the front. The bar 12 makes an approximate right angle downward as it enters the top of the bracket and defines a broad curve of opposite direction as it extends downward and exits out the back of the bracket near its bottom. As the bar 12 is positioned in the bracket, a removable securing pin (e.g. a bolt and nut assembly, friction pin, cotter pin or the like) is inserted through the sidewalls of the bracket at about its midpoint and behind the bar thereby holding it in place. The pin prevents movement of the bar 12 upwardly as wires contact the cutter hooks 14 and the close fitting sidewalls of the bracket prevent the bar from twisting sideways during operation.

Other types of hitches can be used to hold the safety unit to the bottom of a snowmobile; for example, a standard ball and cap type hitch can be used.

I claim:

1. A safety apparatus for snowmobiles which comprises an elongated bar for mounting to the center front nose portion of a snowmobile and extending from near the bottom of a snowmobile when attached thereto to a height so as to be at least about several inches above the head of an occupant of the snowmobile, said bar being formed into an outwardly projecting section near its lower end and conforming generally with the profile of the center of the nose of said snowmobile above said outwardly projecting section, and being substantially vertically upwardly curved above the top of said snowmobile, a plurality of cutter clips on said bar at predetermined spaced apart intervals along its length, each of said cutter clips being a hook member, each hook member having an angled inner face providing a throat, each said throat providing an angular, tapered cutting surface across its width from edge to edge such that one edge is ahead of the other edge, said throat serving to catch a wire strand as it slides along the bar whereby the one sharp edge of said cutting surface contacts the wire before the other edge and shears through the wire when such is encountered by a snowmobile having the safety apparatus attached thereto.

2. The safety apparatus as defined in Claim 1 wherein the lower portion of the outward projection extends back toward the snowmobile and wherein at least one of said clips is below the outwardly projecting section of said bar and at least one of said clips is above said outwardly projecting section immediately below the windshield of said snowmobile.

3. The safety apparatus as defined in claim 2 wherein the lower outwardly projecting section is curved.

4. The safety apparatus as defined in claim 2 wherein the lower outwardly projecting section is angular.

5. The safety apparatus as defined in claim 2 and having a cutter clip at the top of the vertical section of said bar.

6. The safety apparatus as defined in claim 1 and having a brightly colored rounded knob at the top end of said bar.

7. The safety apparatus as defined in claim 1 which is detachably mountable onto a snowmobile.

8. The safety apparatus as defined in claim 1 which is permanently attached to a snowmobile.

9. The safety device as defined in claim 1 wherein the cutter clips are separately fabricated and affixed to said bar.

10. The safety device as defined in claim 1 wherein the cutter clips are integral to said bar.

* * * * *